(12) United States Patent
Huang

(10) Patent No.: US 9,892,055 B2
(45) Date of Patent: Feb. 13, 2018

(54) EMBEDDED DEVICE AND MEMORY MANAGEMENT METHOD THEREOF

(71) Applicant: MStar Semiconductor, Inc., Hsinchu, Hsien (TW)

(72) Inventor: Chien-Hsing Huang, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 154 days.

(21) Appl. No.: 14/963,426

(22) Filed: Dec. 9, 2015

(65) Prior Publication Data
US 2016/0170899 A1 Jun. 16, 2016

(30) Foreign Application Priority Data

Dec. 10, 2014 (TW) .............................. 103143000 A

(51) Int. Cl.
| | |
|---|---|
| G06F 12/00 | (2006.01) |
| G06F 12/1009 | (2016.01) |
| G06F 12/06 | (2006.01) |
| G06F 12/1081 | (2016.01) |

(52) U.S. Cl.
CPC ...... *G06F 12/1009* (2013.01); *G06F 12/0638* (2013.01); *G06F 12/1081* (2013.01); *G06F 2212/1044* (2013.01); *G06F 2212/171* (2013.01); *G06F 2212/651* (2013.01); *G06F 2212/657* (2013.01)

(58) Field of Classification Search
CPC ............. G06F 12/1009; G06F 12/0638; G06F 12/1081; G06F 2212/1044; G06F 2212/171; G06F 2212/651; G06F 2212/657
See application file for complete search history.

(56) References Cited

U.S. PATENT DOCUMENTS

2014/0156930 A1* 6/2014 Isloorkar ............. G06F 12/0811
711/122

OTHER PUBLICATIONS

Taiwan Office Action dated Aug. 6, 2015, 6 pages.

* cited by examiner

*Primary Examiner* — Shawn X Gu
(74) *Attorney, Agent, or Firm* — Edell, Shapiro & Finnan, LLC

(57) ABSTRACT

An embedded device and a memory management method of the embedded device are provided. The embedded device includes a system memory and hardware memory. An operating system of the embedded device operates based on virtual memory addresses. The method includes: mapping the virtual memory addresses to indirect memory addresses by a first memory management unit; and mapping the indirect memory addresses to physical addresses of the hardware memory and selectively to physical addresses of the system memory by a second memory management unit, such that the operating system of the embedded device is able to access the hardware memory.

18 Claims, 10 Drawing Sheets

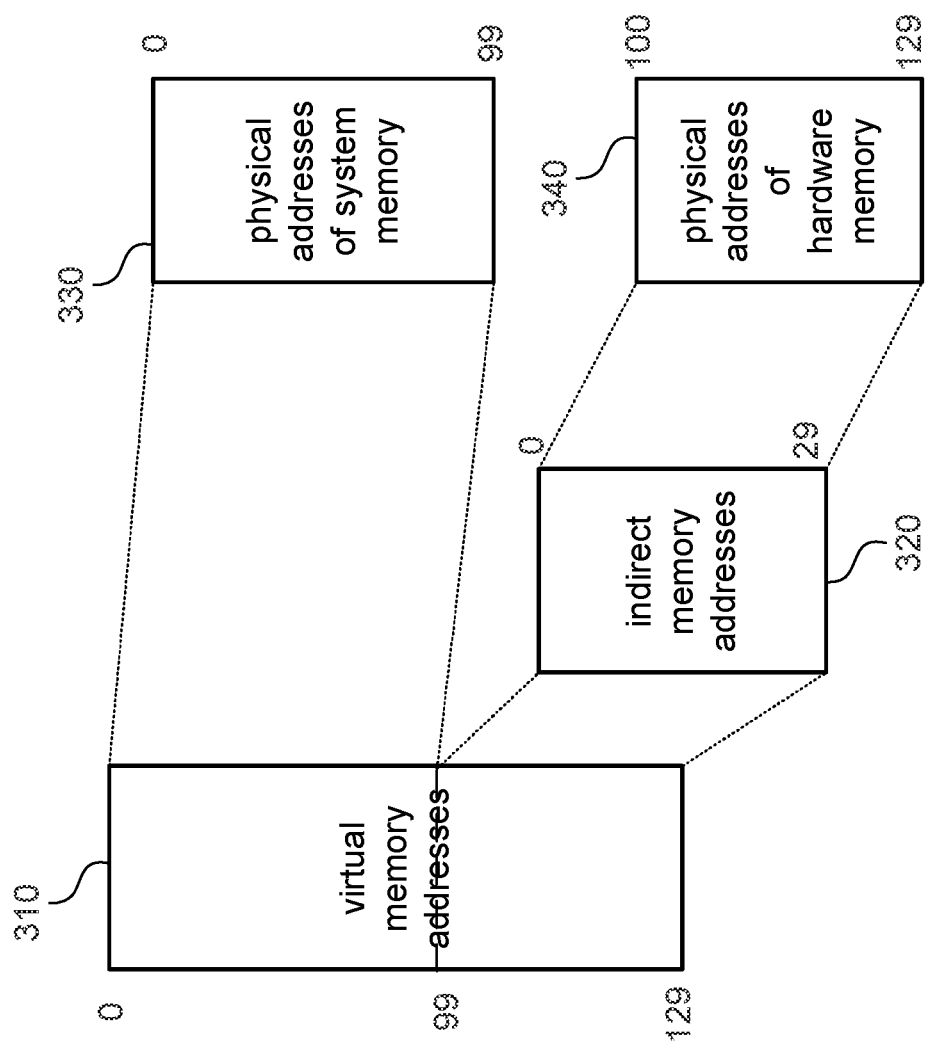

| virtual memory addresses | indirect memory addresses | physical memory address | size |
|---|---|---|---|
| 0 | — — | 0 | 100 |
| 100 | 0 | — — | 30 |
|  |  |  |  |
|  |  |  |  |

FIG. 5a

| indirect memory addresses | physical memory address | size |
|---|---|---|
| 0 | 100 | 30 |
|  |  |  |
|  |  |  |
|  |  |  |

FIG. 5b

| virtual memory addresses | indirect memory addresses | physical memory address | size |
|---|---|---|---|
| 0 | — — | 0 | 100 |
| 100 | 0 | — — | 30 |
| | | | |
| | | | |

FIG. 7a

| indirect memory addresses | physical memory address | size |
|---|---|---|
| 0 | 100 | 10 |
| 10 | 110 | 20 |
| | | |
| | | |

FIG. 7b

| virtual memory addresses | indirect memory addresses | physical memory address | size |
|---|---|---|---|
| 0 | — — | 0 | 100 |
| 100 | 0 | — — | 30 |
|  |  |  |  |
|  |  |  |  |

FIG. 9a

| indirect memory addresses | physical memory address | size |
|---|---|---|
| 0 | 75 | 10 |
| 10 | 110 | 20 |
|  |  |  |
|  |  |  |

FIG. 9b

EMBEDDED DEVICE AND MEMORY MANAGEMENT METHOD THEREOF

This application claims the benefit of Taiwan application Serial No. 103143000, filed Dec. 10, 2014, the subject matter of which is incorporated herein by reference.

BACKGROUND OF THE INVENTION

Field of the Invention

The invention relates in general to an embedded device and a memory management method of the embedded device, and more particularly to an embedded device capable of dynamically expanding a memory without reactivating the embedded device using a second level memory management unit (MMU) and a memory management method of the embedded device.

Description of the Related Art

FIG. 1 shows a functional block diagram of a conventional embedded device. The embedded device 100 includes a processing unit 110, a memory management unit (MMU) 115, a function module 120, a system memory 130 and a hardware memory 140. The embedded device 100 has limited hardware resources, and provides hardware devices of specific functions, e.g., devices including televisions, cell phones and multimedia players. A higher-end embedded device 100 usually carries an operating system to process more complication processes. The processing unit 110 utilizes the system memory 130 to operate the operating system. In general, the processing unit 110 accesses the system memory 130 through the built-in MMU 115. One main function of the MMU 115 is mapping virtual memory addresses (or referred to as logic addresses) that the operating system utilizes to physical memory addresses of the system memory 130, and features advantages of allowing the processing unit 110 to more efficiently utilize the system memory 130 and enhancing the security of the operating system. Operation principles of the MMU 115 are generally known to one person skilled in the art, and shall be omitted herein. The function module 120 of the embedded device 10 mainly provides the embedded device 100 with a predetermined function. For example, the function module 120 may be an image decoding circuit if the embedded device 100 is a television, or may be a radio-frequency (RF) transceiving circuit if the embedded device 100 is a cell phone. In general, the function module 120 requires a continuous block of physical memory for operations. After the operating system operates for a period of time, there is a great possibility that the unused memory space of the system memory 130 becomes fragmented. That is, an unused memory space with continuous physical memory addresses may not be obtained for the function module 120. Thus, the function module 120 usually has an exclusive hardware memory 140, which is independent from the system memory 130. When the function module 120 operates, the function of the function module 120 may be achieved through accessing the hardware memory 140. However, in a conventional embedded device 100, when the function module 120 completes its task and enters an idle state, the hardware memory 140 also enters an idle state, leading to a waste in hardware resources. For the embedded device 100 that values hardware resources, if the idle hardware memory 140 can be better employed without affecting the access of the hardware memory 140 when the function module 120 returns from the idle state to an operating state, the performance of the embedded device 100 can be further enhanced.

SUMMARY OF THE INVENTION

The invention is directed to an embedded device and a memory management method of the embedded device to more efficiently utilize memories.

According to an embodiment of the present invention, a memory management method of an embedded device is provided. The embedded device includes a system memory and a hardware memory. An operating system of the embedded memory operates based on virtual memory addresses. The method includes: mapping the virtual memory addresses to indirect memory addresses by a first memory management unit (MMU); and mapping the indirect memory addresses to physical addresses of the hardware memory and selectively to physical addresses of the system memory by a second MMU.

According to another embodiment of the present invention, an embedded device is provided. The embedded device includes: a system memory; a hardware memory; a first MMU, configured to map the virtual memory addresses to indirect memory addresses; and a second MMU, configured to map the indirect memory addresses to physical addresses of the hardware memory and selectively to physical addresses of the system memory, such that the operating system of the embedded device is able to access the hardware memory.

The embedded device and the memory management method of the embedded device of the present invention are capable of allowing the operating system to utilize the idle hardware memory and temporarily expanding the system memory of the embedded device. Compared to the prior art, the embedded device and the memory management method of the embedded device of the present invention dynamically allow the operating system to utilize the hardware memory according to a utilization condition of the hardware memory, and immediately return the hardware memory to the function module when the function module corresponding to the hardware memory returns from an idle state to an operating state without affecting subsequent operations of the function module. During the above process of borrowing and returning the hardware memory, reactivating the embedded device is not required.

The above and other aspects of the invention will become better understood with regard to the following detailed description of the preferred but non-limiting embodiments. The following description is made with reference to the accompanying drawings.

BRIEF DESCRIPTION OF THE DRAWINGS

FIG. 4 is a schematic diagram of a mapping relationship of virtual memory addresses, indirect memory addresses and physical memory addresses according to an embodiment of the present invention;

FIG. 5a and FIG. 5b are schematic diagrams of a page table of a first level MMU and a page table of a second MMU according to an embodiment of the present invention;

FIG. 7a and FIG. 7b are schematic diagrams of a page table of a first level MMU and a page table of a second MMU according to another embodiment of the present invention;

FIG. 9a and FIG. 9b are schematic diagrams of a page table of a first level MMU and a page table of a second MMU according to another embodiment of the present invention.

DETAILED DESCRIPTION OF THE INVENTION

Technical terms of the application are based on the general definition in the technical field of the application. If the application describes or explains one or some terms, definitions of the terms are based on the description or explanation of the application.

The disclosure of the present invention includes an embedded device and a memory management method of the embedded device capable of efficiently exercising an idle hardware memory in the embedded device. The device and method are applicable to an embedded device having a second level memory management unit (MMU). In possible implementation, one skilled person in the art may choose equivalent devices or steps to implement the disclosure based on the disclosure of the application. That is, the implementation of the disclosure is not limited in the embodiments described in the disclosure.

Figure 1:
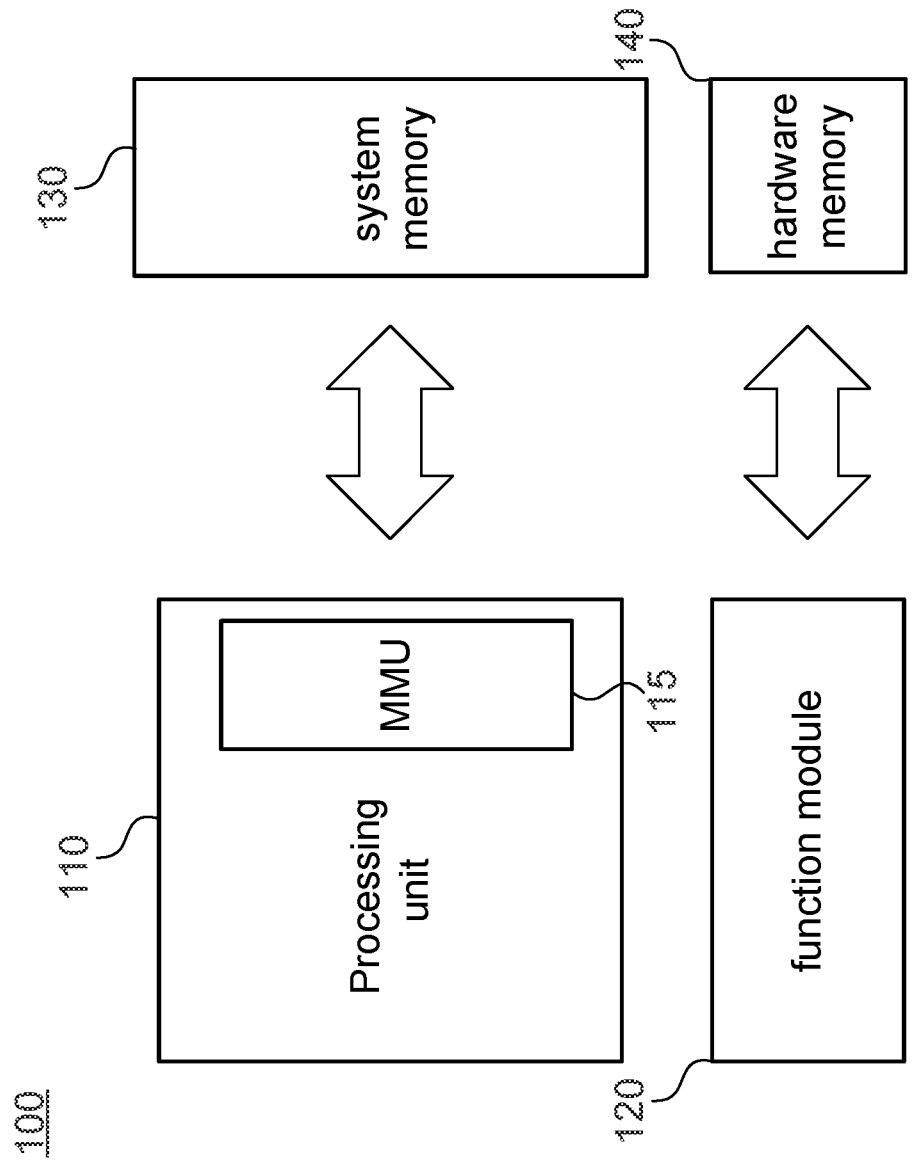
FIG. 1 is a functional block diagram of a conventional embedded device.
Figure 2:
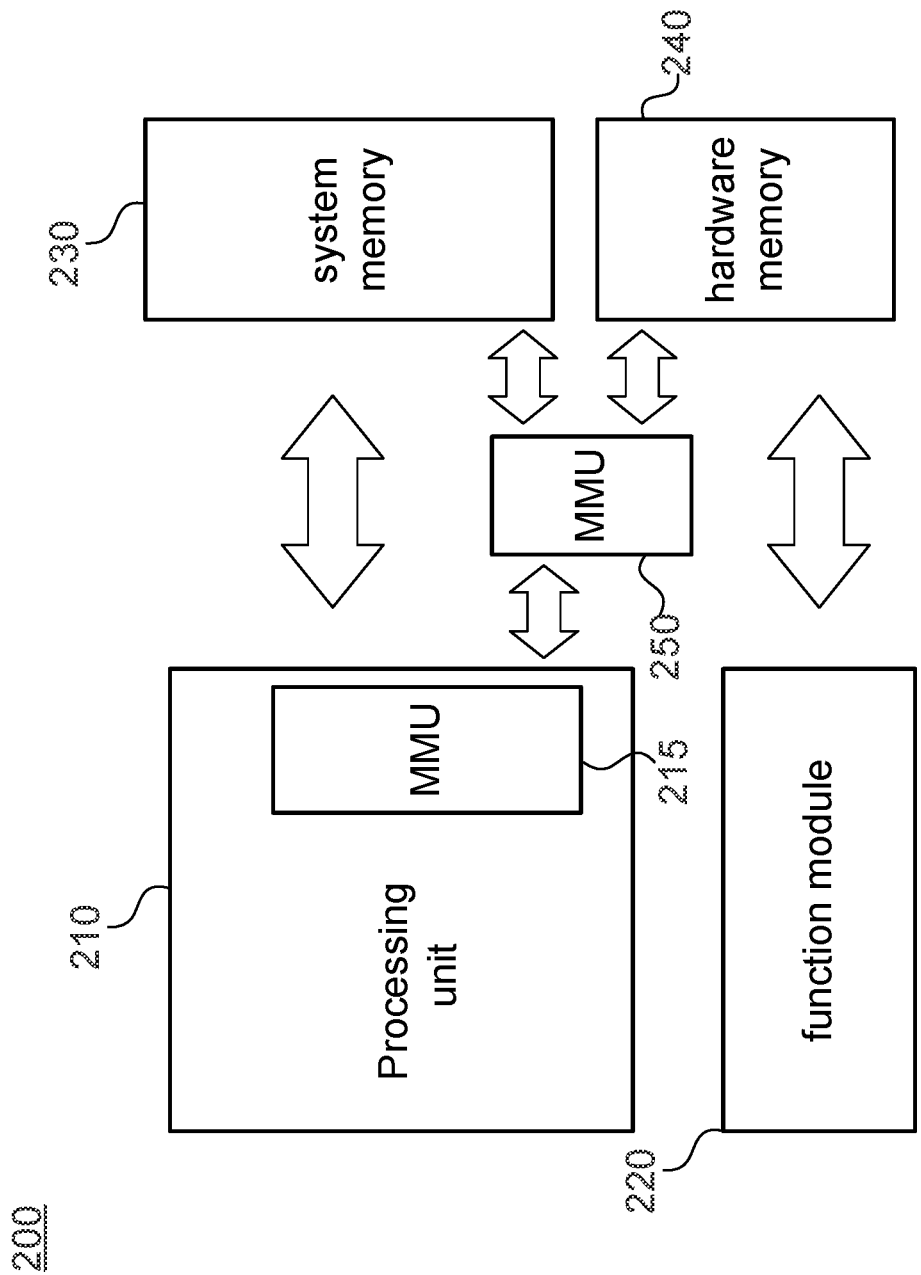
FIG. 2 is a functional block diagram of an embedded device according to an embodiment of the present invention.

FIG. 2 shows a functional block diagram of an embedded device according to an embodiment of the present invention. An embedded device 200 includes a processing unit 210, an MMU 215, a function module 220, a system memory 230, a hardware memory 240 and an MMU 250. Functions of the processing unit 210, the function module 220, the system memory 230 and the hardware memory 240 are identical or similar to the functions of the elements having the same names in FIG. 1, and shall be omitted herein. Compared to the conventional embedded device 100, the embedded device 200 of the present invention further includes the MMU 250, which is between the processing unit 210, the hardware memory 240 and the system memory 230. More specifically, the MMU 250 is between the MMU 215, the hardware memory 240 and the system memory 230, is coupled to the processing unit 210, the system memory 230 and the hardware memory 240 via a bus, and provides another layer of mapping mechanism between virtual memory addresses of the operating system and physical addresses of the system memory 230 and/or the hardware memory 240. It should be noted that, in another embodiment, the processing unit may already includes two MMUs. One purpose of such high-level processing unit is to simultaneously support more than two operating systems in a virtual machine (VM). One (the first MMU) of the MMUs is in charge the mapping between virtual memory addresses of one operating system and indirect memory addresses, and the other MMU (the second level MMU) is in charge of the mapping between the indirect memory addresses and physical addresses of a memory managed by the VM.

Figure 3:
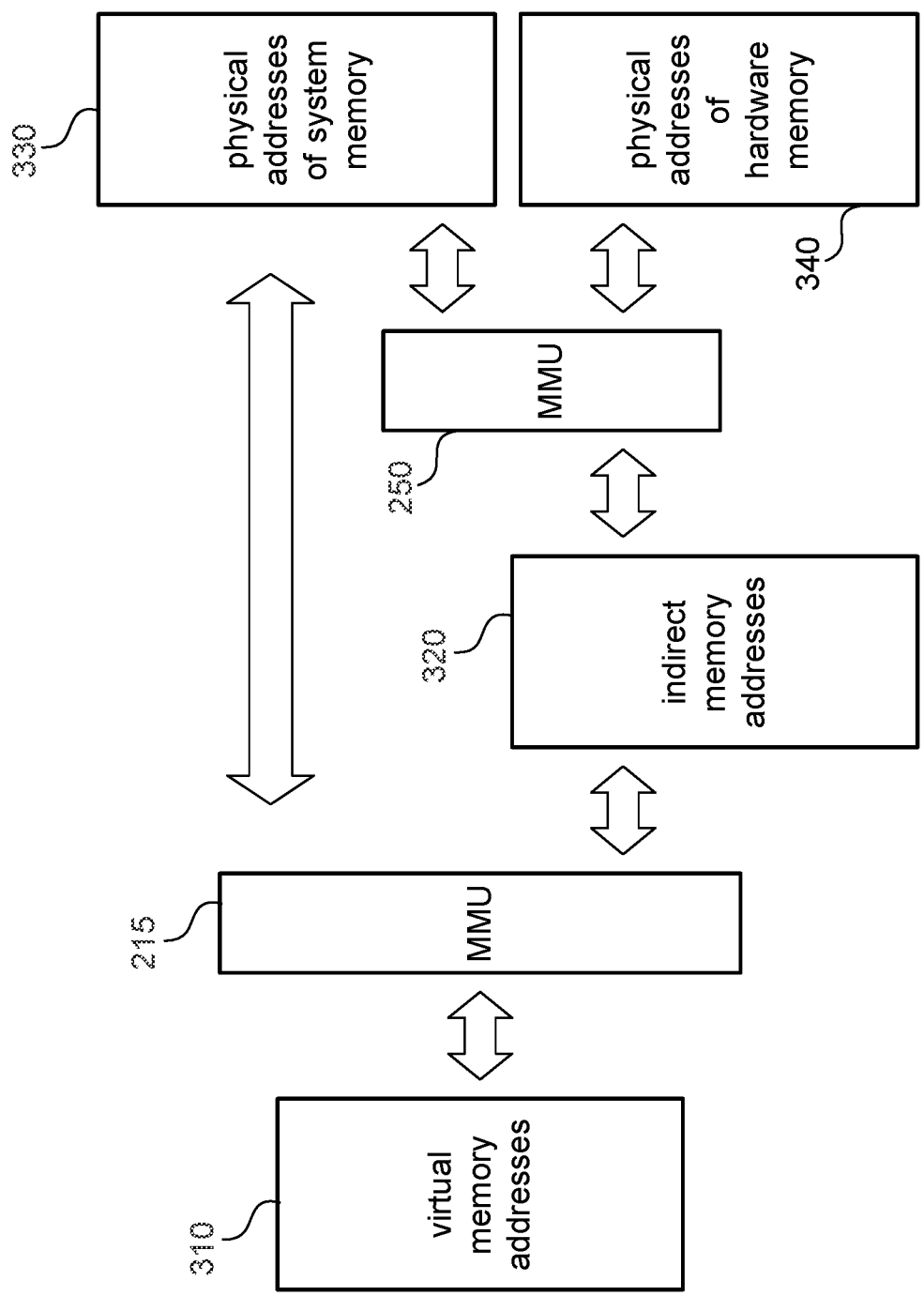
FIG. 3 is a schematic diagram of a mapping relationship of a first level MMU, a second level MMU and memory addresses of the present invention.

FIG. 3 shows a schematic diagram of a mapping relationship between two MMUs and memory addresses of the present invention. In addition to directly mapping physical addresses 330 of the system memory 130 to virtual memory addresses 310 of the operating system of the embedded device 200 utilizes, the MMU 215 (the first level MMU) is also in charge of the mapping between the virtual memory addresses 310 and indirect memory addresses 320. The MMU 250 (the second level MMU) is in charge of the mapping between the indirect memory addresses 320, the physical addresses 330 of the system memory and the physical addresses 340 of the hardware memory. Assuming that the operating system the embedded system 200 utilizes is Linux architecture, many page frame numbers (pfn) are distributed among operating system programs and application programs. These page frame numbers point to the virtual memory addresses and assist the operating system programs and application programs to obtain current physical addresses of the system memory. In the conventional embedded device 100, the virtual memory addresses are directly mapped to the physical addresses of the system memory via the MMU 115. When the MMU 115 changes a page table in a way that mapping conditions of the virtual memory addresses and physical memory addresses of the system memory are changed, all associated page frame numbers also need to be changed, resulting in a tremendous load on the system. In the present invention, the MMU 250 performs another layer of mapping between the virtual memory addresses 310, the physical addresses 330 of the system memory and the physical addresses 340 of the hardware memory. As such, the physical addresses 340 of the hardware memory and/or the physical addresses 330 of the system memory are first mapped to the indirect memory addresses 320, and then mapped to the virtual memory addresses 310. Therefore, in the present invention, when the indirect memory addresses 320 are mapped to different physical addresses 340 of the hardware memory and/or the physical addresses 330 of the system memory when the page table of the MMU 250 is changed, the mapping relationship between the virtual memory addresses 310 and the indirect memory addresses 320 are unaffected, thereby eliminating inconveniences of modifying the page frame numbers for the operating system of the embedded device 200.

FIG. 4 shows a schematic diagram of a mapping relationship of virtual memory addresses, indirect memory addresses and physical memory (including the system memory and the hardware memory) addresses according to an embodiment of the present invention. In the embodiment below, it is assumed that the virtual memory addresses 310 of the operating system of the embedded device 200 are directly or indirectly mapped to physical memory addresses 0 to 129, to indicate that the operating system is allowed to utilize 130 units of memory resource under an optimum condition. It should be noted that, the values 0 to 129 of the physical memory addresses are represented in decimal, and indicate relative sizes of the memory instead of representing absolute addresses. In practice, the memory addresses in a computer program may be represented in other forms, and may have different sizes and values. It is known from FIG. 4 that, the system memory 230 and the hardware memory 240, which may be the same block of memory, are respectively designated as the system memory 230 and the hardware memory 240 when the system is booted, and have different physical memory addresses. In FIG. 4, the virtual memory addresses 310 may be divided into two parts. The first part (the addresses numbered 0 to 99) is fixedly mapped to the system memory 230; the second part (the addresses numbered 100 to 129) is mapped to the indirect memory addresses 320, which dynamically change addresses mapped to the system memory 230 and/or the hardware memory 240 according to an operating or idle condition of the hardware memory 240. It should be noted that, the addresses of the first part and the second part are illustrations but not limitations of the present invention. The first part and the second part may have other configuration methods. For example, the second part is the virtual memory addresses numbered 50 to 79, and the remaining addresses are the first part. In the embodiment in FIG. 4, the physical memory addresses of the hardware memory 240 are numbered 100 to 129, and have a size of 30 units. When the corresponding function module 220 is in an idle state, the hardware memory 240 can be temporarily utilized by the operating system. The MMU 250 maps all of the indirect memory addresses 320 to the physical memory addresses of the hardware memory 240. That is to say, in the embodiment in FIG. 4, the additional memory resource of the embedded device 200 is all provided by one single hardware memory 240. FIG. 5a and FIG. 5b show schematic diagrams of a page table of the first level MMU 215 and a page table of the second level MMU 250 according to an embodiment of the present invention. In FIG. 5a, the first part of the virtual memory addresses 310 is mapped to the physical memory addresses numbered 0 to 99 (i.e., the system memory 230), and the second part is mapped to the indirect memory addresses numbered 0 to 29 (i.e., the entire indirect memory 320). In FIG. 5b, all of the indirect memory addresses numbered 0 to 29 are mapped to the part of the physical memory addresses numbered 100 to 129 (i.e., the entire hardware memory 240).

Figure 6:
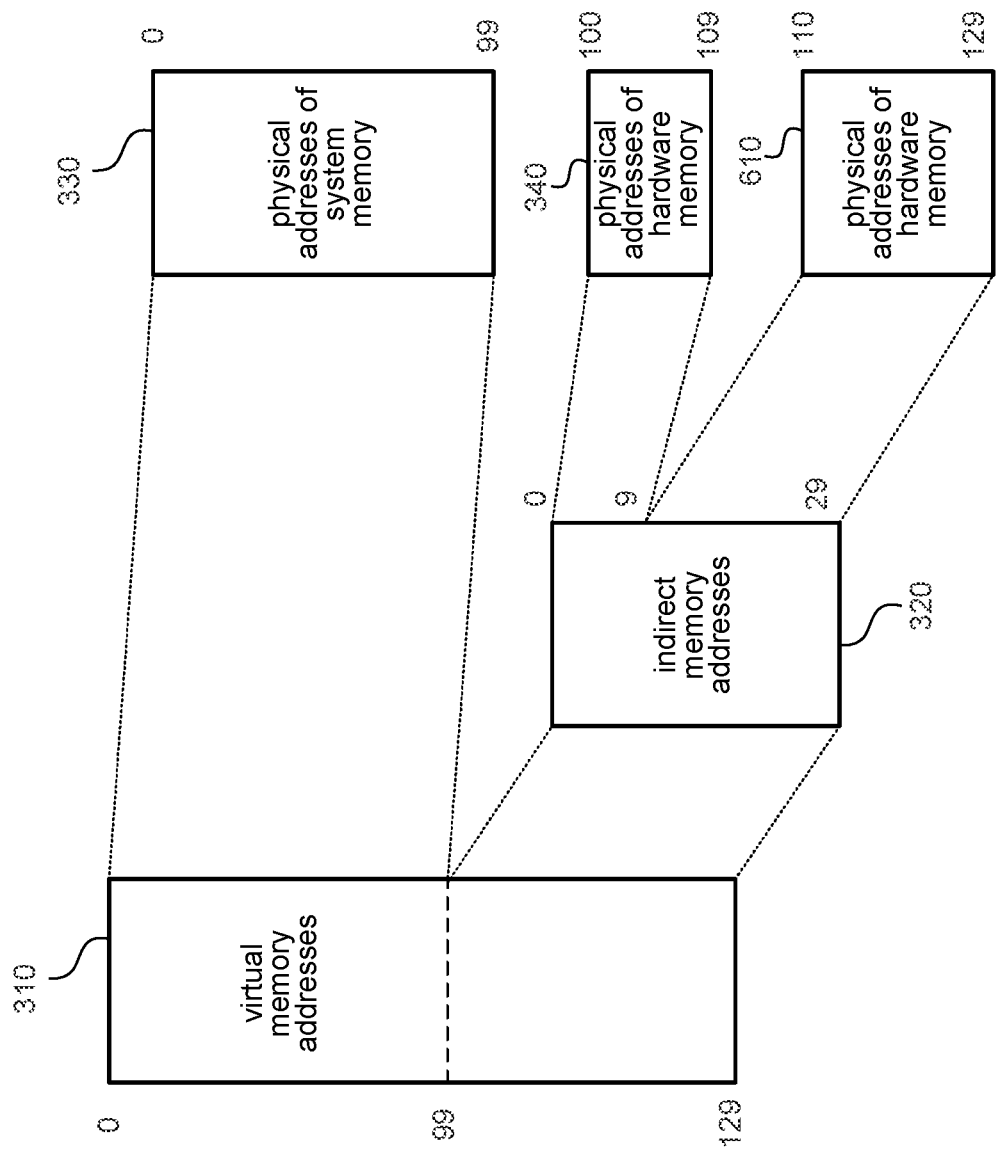
FIG. 6 is a schematic diagram of a mapping relationship of virtual memory addresses, indirect memory addresses and physical memory addresses according to another embodiment of the present invention.

FIG. 6 shows a schematic diagram of a mapping relationship of virtual memory addresses, indirect memory addresses and physical memory addresses according to another embodiment of the present invention. In the embodiment, the embedded device 200 further includes a hardware memory 610. The hardware memory 240 has a size of 10 units, and the hardware memory 610 has a size of 20 units. When the function module (i.e., the function module 220) corresponding to the hardware memory 240 and the function module (not shown) corresponding to the hardware memory 610 are simultaneously in an idle state, the MMU 250 maps the indirect memory addresses 320 to the physical memory addresses of the hardware memory 240 and the hardware memory 610. That is to say, in the embodiment in FIG. 6, the additional memory resource of the embedded device 200 is provided by the hardware memory 240 and the hardware memory 610. FIG. 7a and FIG. 7b show schematic diagrams of a page table of a first level MMU and a page table of a second MMU according to another embodiment of the present invention. In FIG. 7a, the first part of the virtual memory addresses 310 is mapped to the part of the physical memory addresses numbered 0 to 99 (i.e., the system memory 230), and the second part is mapped to the indirect memory addresses 320. In FIG. 7b, the addresses numbered 0 to 9 of the indirect memory addresses are mapped to the part of the physical memory addresses numbered 100 to 109 (i.e., the entire hardware memory 240), and the addresses numbered 10 to 29 are mapped to the part of the physical addresses memory addresses numbered 110 to 129 (i.e., the entire hardware memory 610).

Figure 8:
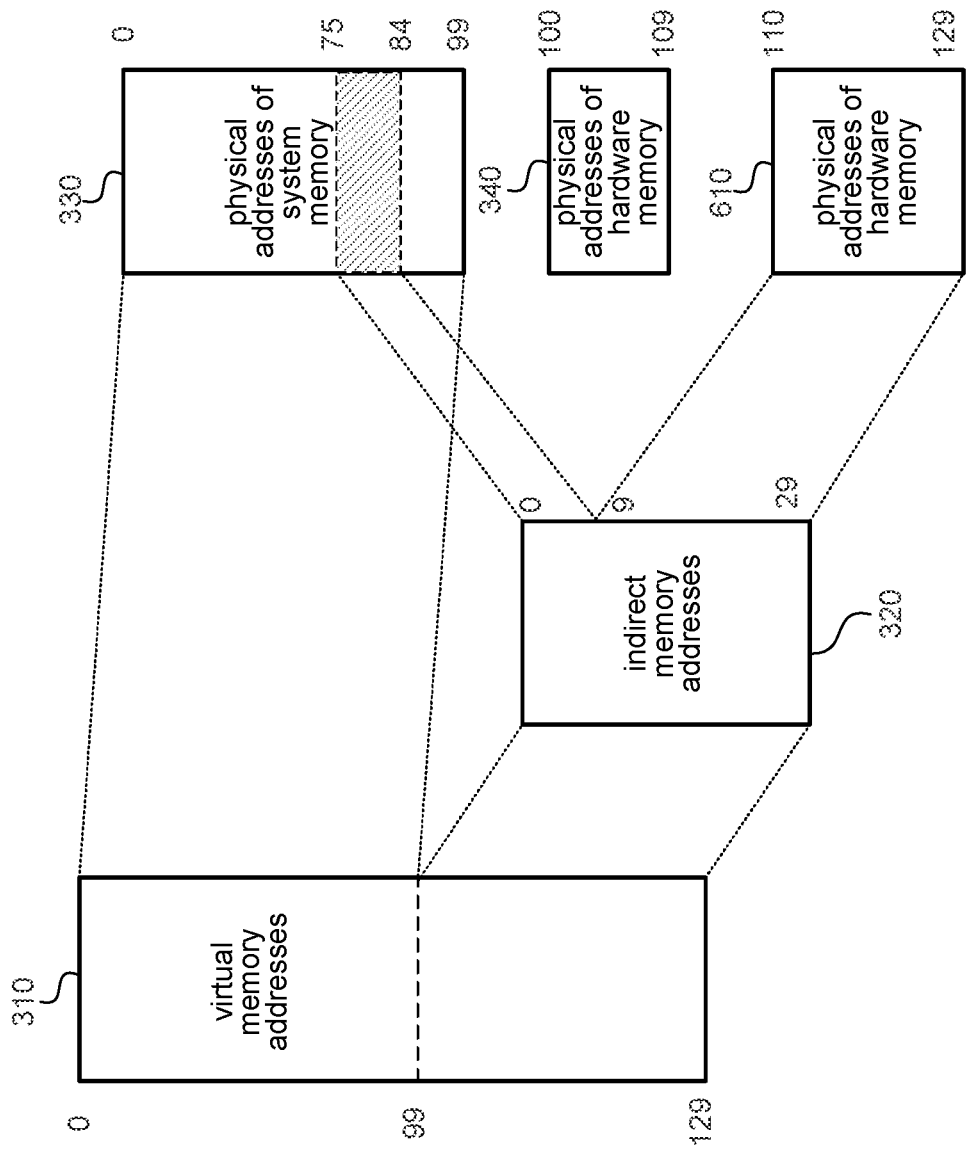
FIG. 8 is a schematic diagram of a mapping relationship of virtual memory addresses, indirect memory addresses and physical memory addresses according to another embodiment of the present invention.

FIG. 8 shows a schematic diagram of a mapping relationship of virtual memory addresses, indirect memory addresses and physical memory addresses according to another embodiment of the present invention. In continuation of the previous embodiment, in this embodiment, when the function module (i.e., the function module 240) corresponding to the hardware memory 240 changes from an idle state to an operating state, the hardware memory 240 needs to be returned to the function module 220. Thus, in the indirect memory addresses 320, the part originally mapped to the hardware memory 240 needs to be switched to be provided by the system memory 230, and the part originally mapped to the hardware memory 610 stays unchanged. In practice, in the event of the above situation, the operating system of the embedded device 200 first obtains an unused memory space having a size of 10 units (e.g., system memory addresses numbered 75 to 84 in FIG. 8) from the system memory 230 through calling the system (e.g., through a function "malloc" or an equivalent instruction in the Linux system), and the MMU 250 maps this section of memory addresses to the part of the indirect memory addresses 320 originally corresponding to the hardware memory 240. Next, the processing unit 210 moves data originally stored in the hardware memory 240 to this newly obtained unused 10-unit memory space, and the hardware memory 240 can then be returned to the function module 220. That is to say, in this embodiment, the additional memory space of the system of the embedded device 200 is provided by the hardware memory 610 and the system memory 230, and therefore the size of the system memory accessible to the embedded system 200 is 100+30−10=120 units. It should be noted that, in this embodiment, the memory addresses numbered 75 to 84 are a continuous block of memory, and may be unused memory spaces in a total of 10 units from separate memory spaces in practice. FIG. 9a and FIG. 9b show schematic diagrams of a page table of a first level MMU and a page table of a second MMU according to another embodiment of the present invention. In FIG. 9a, the first part of the virtual memory addresses 310 are mapped to the physical addresses numbered 0 to 99 (i.e., the system memory 230), and the second part is mapped to the indirect memory addresses 320. In FIG. 9b, the addresses numbered 0 to 9 of the indirect memory addresses 320 are mapped to the physical memory addresses numbered 75 to 84 (i.e., a part of the system memory 230), and the addresses numbered 10 to 29 of the indirect memory addresses 320 are mapped to the physical memory addresses numbered 110 to 129 (i.e., the entire hardware memory 610). As the 10 units in the system memory 230 are for temporarily storing the data originally stored in the hardware memory 240, and at this point the processing unit 210 already learns from the virtual physical addresses 310 that the physical memory addresses numbered 75 to 84 are utilized, and so the size of the usable memory space in the system memory is a total of 120 units. Later when the function module 220 returns from an operating state to an idle state, the processing unit 210 first moves the data temporarily stored in the system memory 230 to the hardware memory 240, then the MMU 250 modifies the page table that thus returns to the state shown in FIG. 7b, and the operating system finally releases the temporary block (e.g., system memory addresses numbered 75 to 84 in FIG. 8). As such, the operating system may again utilize the complete 100 units of the system memory and the additional 30 units of the hardware memory. It should be noted that, in the above process of returning the hardware memory 240 and again incorporating the hardware memory into additional memory resources accessible to the operating system, only the page table of the second level MMU 250 needs to modified without having to reactivating the embedded device 200, hence enhancing operation conveniences. More particularly, there is no need to change all associated page frame numbers when the MMU 250 changes the mapping conditions of the indirect memory addresses 320 and the physical memory addresses of the system memory and the hardware memory.

Figure 10:
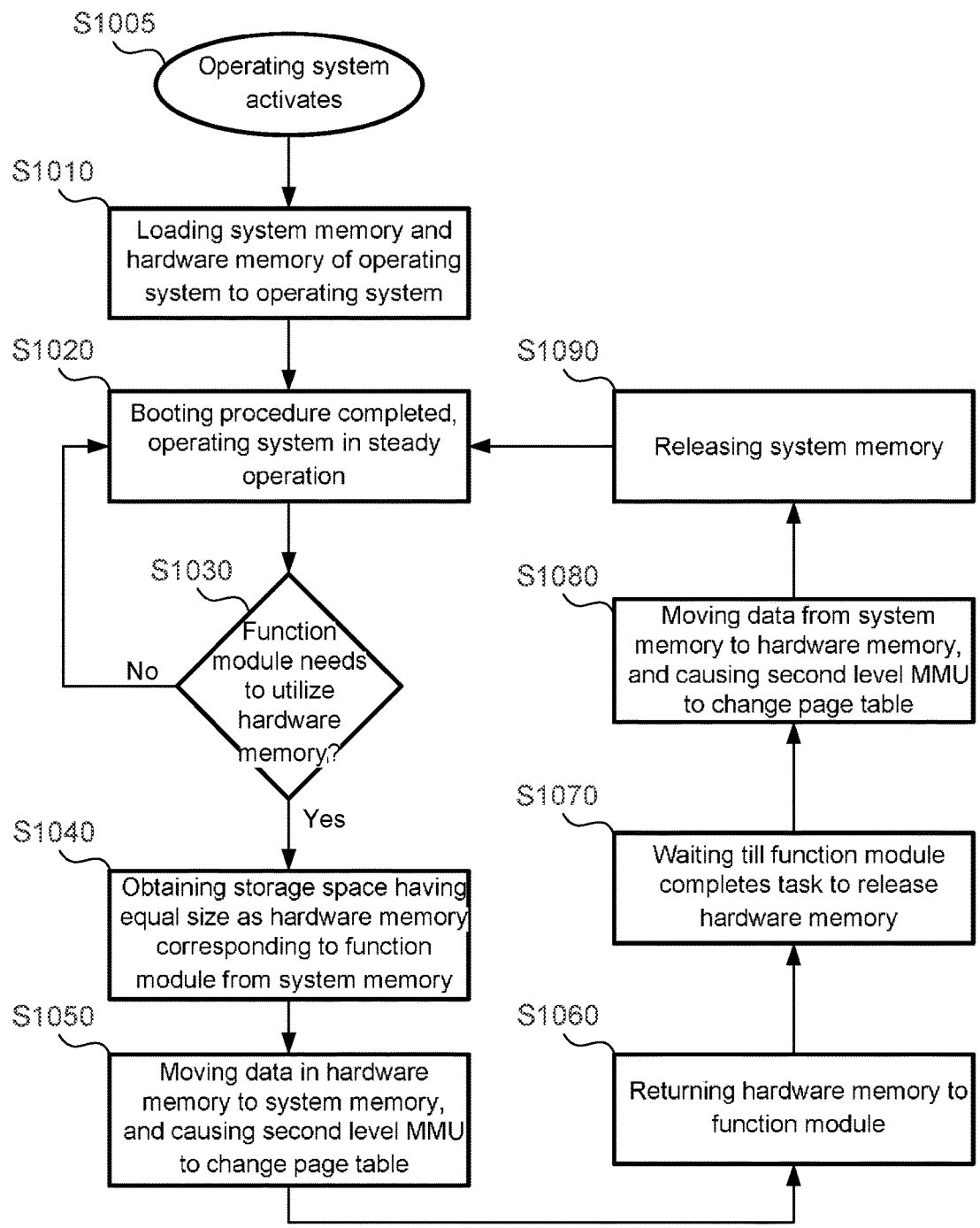
FIG. 10 is a flowchart of a memory management method of an embedded memory according to an embodiment of the present invention.

FIG. 10 shows a flowchart of a memory management method of an embedded device according to an embodiment of the present invention. In addition to the foregoing embedded device, the present invention correspondingly discloses a memory management method of an embedded device to dynamically expand a system memory of the embedded device. The method is performed by the foregoing embedded device 200 or an equivalent device. As shown in FIG. 10, the memory management method of an embedded device according to an embodiment of the present invention includes following steps.

In step S1005, the embedded device is booted, and the operating system is activated.

In step S1010, a system memory and a hardware memory of the embedded device are loaded to the operating system. In a predetermined condition, this step maps a first part of virtual memory addresses to physical addresses of the physical memory, and a second part of the virtual memory addresses to indirect memory addresses by a first level MMU. The operating system of the embedded device accesses memories through the virtual memory addresses. Further, a second level MMU first maps the indirect memory addresses to an idle hardware memory, such that the operating system is able to utilize the hardware memory corresponding to idle function modules as an additional system memory. The mapping of the indirect memory addresses and the hardware memory may be dynamically adjusted according to the state of the function modules. Further, the indirect memory addresses may be mapped to one single memory (as in the embodiment in FIG. 4) or may be mapped to two or more hardware memories (as in the embodiment in FIG. 6).

In step S1020, the booting procedure completes, and the operating system is in steady operation. As the booting procedure has just completed, the operating system may utilize all of the system memory and the additionally loaded hardware memory. Taking the embodiment in FIG. 4 or FIG. 6 for example, the operating system at this point has an access of a total of 130 units of memory resource.

In step S1030, it is determined whether the function module needs to utilize the hardware memory. If the function module is in an idle state, it means that the operating system may continue utilizing the hardware memory corresponding to the function module (returning to step S1020). If the function module needs to utilize the hardware module (e.g., an image decoding unit starts to decoding images), it means that the hardware memory needs to be returned to the function module, i.e., the additional memory resource accessible to the operating system is reduced.

In step S1040, a storage space having a size substantially equal to the hardware memory to be returned to the function module is obtained from the system memory. Before the hardware memory is returned to the function module, the operating system needs to obtain a storage space having a size equal to the hardware memory to be returned from the system memory, so as to move the data in the hardware memory to the system memory. In the embodiment in FIG. 4, to return the hardware memory 240, a 30-unit storage space is to be obtained from the system memory. In the embodiment in FIG. 6, to return the hardware memory 240, a 10-unit storage space is to be obtained from the system memory.

In step S1050, the data in the hardware memory is moved to the system memory, and the second level MMU is caused to change the page table. After the storage space is obtained, the data in the hardware memory is moved to the system memory. At this point, the operating system no longer utilizes the hardware memory, and so the second level MMU needs to change the page table to change the addresses originally pointing to the hardware memory to pointing to the addresses of the obtained storage space. Referring to FIG. 7b and FIG. 9b, after the hardware memory 240 is returned, the address of the indirect memory addresses originally pointing the physical memory address numbered 100 is changed to point to the address numbered 75 in the physical memory addresses. Further, the part in the virtual memory addresses corresponding to the physical memory addresses numbered 75 to 84 is changed to "used", and so the memory resource accessible to the operating system at this point is a total of 100+30−10=120 units of storage space.

In step S1060, the hardware memory is returned to the function module. After the second level MMU modifies the page table, the hardware memory may be returned to the function module for further use.

In step S1070, it is waited till the function module completes its task and the hardware memory can be released. When the function module competes its task (e.g., an image decoding unit completes image decoding), the hardware memory is no longer occupied by the function module, and can be utilized by the operating system.

In step S1080, the data is moved from the system memory to the hardware memory, and the second level MMU is caused to change the page table. After the hardware memory returns to an idle state, the data moved to the system memory in step S1050 is moved to the hardware memory, and the second level MMU modifies the page table such that the part in the indirect memory addresses pointing to the system memory is changed to point to the hardware memory. Thus, the operating system has additional available system memory (e.g., the hardware memory 240 returns to an idle state from an operating state in FIG. 8, and the MMU 250 changes the page table from FIG. 9b to FIG. 7b).

In step S1090, the system memory is released. After the data is moved in step S1080, the system memory obtained in step S1040 needs to be released. At this point, the operating system may utilize the complete system memory and the additionally loaded hardware memory (returning to step S1020).

One person skilled in the art can understand implementation details and variations of the method in FIG. 10 from the disclosure of the devices in FIG. 2 to FIG. 9. While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A memory management method, applied to an embedded device, the embedded device comprising a system memory and a hardware memory, the embedded device operating based on addresses of a virtual memory, the method comprising:

mapping a part of the addresses of the virtual memory to addresses of an indirect memory; and mapping the addresses of the indirect memory to physical addresses of at least one of the hardware memory and the system memory,
wherein the hardware memory corresponds to a function module of the embedded device, and the step of mapping the addresses of the indirect memory to the physical addresses of the at least one of the hardware memory and the system memory comprises:
when the function module is in an idle state, mapping a part of the addresses of the indirect memory to the hardware memory, and
when the function module enters an operating state from the idle state, mapping the part of the addresses of the indirect memory mapped to the hardware memory to the system memory.

2. The memory management method according to claim 1, an operating system of the embedded device comprising a page frame number pointing to the addresses of the virtual memory, the method further comprising:
changing the physical addresses that the addresses of the indirect memory are mapped, wherein the page frame number stays unchanged.

3. The memory management method according to claim 1, further comprising:
moving data stored in the hardware memory to the system memory.

4. The memory management method according to claim 1, further comprising:
when the function module enters the idle state from the operating state, mapping the part of the addresses of the indirect memory mapped to the system memory to the hardware memory.

5. The memory management method according to claim 4, further comprising:
moving data stored in the system memory to the hardware memory.

6. The memory management method according to claim 1, the embedded device further comprising another hardware memory, the hardware memory and the another hardware memory respectively corresponding to a function module and another function module of the embedded device, wherein the step of mapping the addresses of the indirect memory to the physical addresses of the at least one of the hardware memory and the system memory comprises:
when the function module and the another function module are both in an idle state, mapping a part of the addresses of the indirect memory to the hardware memory, and mapping another part of the addresses of the indirect memory to the another hardware memory.

7. The memory management method according to claim 6, further comprising:
when the another function module enters an operating state from the idle state, mapping the another part of the addresses of the indirect memory mapped to the another hardware memory to the system memory.

8. An embedded device, loaded with an operating system that operates based on addresses of a virtual memory, the embedded system comprising:
a system memory;
a hardware memory;
a first memory management unit (MMU), configured to map a part of the addresses of the virtual memory to addresses of an indirect memory; and
a second MMU, coupled to the system memory and the hardware memory, configured to map the addresses of the indirect memory to physical addresses of at least one of the hardware memory and the system memory,
the embedded system further comprising a function module, wherein the hardware memory corresponds to the function module and when the function module is in an idle state, the second MMU maps a part of the addresses of the indirect memory to the hardware memory, and
wherein when the function module enters an operating state from the idle state, the second MMU maps the part of the addresses of the indirect memory mapped to the hardware memory to the system memory.

9. The embedded system according to claim 8, wherein the operating system comprises a page frame number pointing to the addresses of the virtual memory; when the second MMU changes the physical addresses that the addresses of the indirect memory are mapped to, the page frame number is kept unchanged.

10. The embedded system according to claim 8, wherein when the second MMU maps the part of the addresses of the indirect memory mapped to the hardware memory to the system memory, the system memory is for storing data moved from the hardware memory.

11. The embedded system according to claim 8, wherein when the function module enters the idle state from the operating state, the second MMU maps the part of the addresses of the indirect memory mapped to the system memory to the hardware memory.

12. The embedded system according to claim 11, wherein when the second MMU maps the part of the addresses of the indirect memory mapped to the system memory to the hardware memory, the hardware memory is for storing data moved from the system memory.

13. The embedded system according to claim 8, further comprising:
a function module, corresponding to the hardware memory;
another hardware memory; and
another function module, corresponding to the another hardware memory;
wherein, when the function module and the another function module are both in an idle state, the second MMU maps a part of the addresses of the indirect memory to the hardware memory, and maps another part of the addresses of the indirect memory to the another hardware memory.

14. The embedded system according to claim 13, wherein when the another function module enters an operating state from the idle state, the second MMU maps the another part of the addresses of the indirect memory mapped to the another hardware memory to the system memory.

15. The embedded system according to claim 8, further comprising:
a processing unit;
wherein, the first MMU and the second MMU are comprised in the processing unit.

16. The embedded system according to claim 8, further comprising:
a processing unit;
wherein, the first MMU is comprised in the processing unit, and the second MMU is between the processing unit, the system memory and the hardware memory and is coupled to the processing unit, the system memory and the hardware memory via a bus.

17. A memory management method, applied to an embedded device, the embedded device comprising a system memory and a hardware memory, the embedded device operating based on addresses of a virtual memory, the method comprising:

mapping a part of the addresses of the virtual memory to addresses of an indirect memory; and mapping the addresses of the indirect memory to physical addresses of at least one of the hardware memory and the system memory, wherein the embedded device further comprising another hardware memory, the hardware memory and the another hardware memory respectively corresponding to a function module and another function module of the embedded device, wherein the step of mapping the addresses of the indirect memory to the physical addresses of the at least one of the hardware memory and the system memory comprises:

when the function module and the another function module are both in an idle state, mapping a part of the addresses of the indirect memory to the hardware memory, and mapping another part of the addresses of the indirect memory to the another hardware memory, and when the another function module enters an operating state from the idle state, mapping the another part of the addresses of the indirect memory mapped to the another hardware memory to the system memory.

18. An embedded device, loaded with an operating system that operates based on addresses of a virtual memory, the embedded system comprising:

a system memory;
a hardware memory;
a first memory management unit (MMU), configured to map a part of the addresses of the virtual memory to addresses of an indirect memory; and
a second MMU, coupled to the system memory and the hardware memory, configured to map the addresses of the indirect memory to physical addresses of at least one of the hardware memory and the system memory,
the embedded system further comprising:
a function module, corresponding to the hardware memory;
another hardware memory; and
another function module, corresponding to the another hardware memory;
wherein, when the function module and the another function module are both in an idle state, the second MMU maps a part of the addresses of the indirect memory to the hardware memory, and maps another part of the addresses of the indirect memory to the another hardware memory, and
wherein when the another function module enters an operating state from the idle state, the second MMU maps the another part of the addresses of the indirect memory mapped to the another hardware memory to the system memory.

\* \* \* \* \*